Patented Sept. 30, 1941

2,257,148

UNITED STATES PATENT OFFICE 2,257,148

CAPILLARY ACTIVE PRODUCT

Albert Ballauf and Otto Bayer, Leverkusen I. G.-Werk, Germany, assignors, by mesne assignments, to General Aniline & Film Corporation, New York, N. Y., a corporation of Delaware No Drawing. Application August 9, 1938, Serial No. 223,934. In Germany September 1, 1937

5 Claims. (Cl. 260—508)

The present invention relates to the manufacture of capillary active products from aromatic amino compounds.

We have found that products of very good capillary active properties can be obtained by introducing water-solubilizing groups into secondary aromatic amines which contain an alkyl radical (including the cycloalkyl radicals) attached to the amino group and at least 1 alkyl radical (including the cycloalkyl radicals) having at least 3 carbon atoms as a substituent of an aromatic nucleus, the total number of carbon atoms of the said substituents of the secondary amino group and of an aromatic nucleus being at least 10.

As secondary aromatic amines being suitable for our present process we may mention, for instance, propylheptyl-, dipropylheptyl-, butylhexyl-, dibutylhexyl-, butylcyclohexyl-, dicyclohexyl-, hexylheptyl-, dihexyl-, diheptyl-, hexyloctyl-, hexyldodecyl-, hexylhexadecyl-, heptyloctodecyl-, didodecyl-anilines, -toluidines, -xylidines or -naphthyl amines; the polynuclear aromatic amines may also be partially hydrogenated. It may be mentioned that in the foregoing products the alkyl substituents may stand in the secondary amino group as well as in an aromatic nucleus. The said substituents may be straight-chained or branched. Instead of the pure amines also mixtures thereof may be employed, for instance such as can be obtained from technical olefines which have been prepared, for instance, by cracking or otherwise dehydrogenating hydrocarbon mixtures (benzine, paraffins) or by dehydrating mixtures of fatty alcohols or by polymerizing low molecular olefines.

The water-solubilizing groups may be introduced into such amines, for instance, by treating with strong sulfonating agents like oleum or chlorosulfonic acid, or by forming sulfaminic acid groups with the aid of halogen sulfonic acid salts. Other methods for introducing solubilizing groups are, for instance, treating the amines with alkylene oxides at least until they have become water-soluble, or treating with alkylene oxides and, thereupon, with sulfonating agents at least until water-solubility is reached. The amines may also, before or after oxyalkylation, be reacted with anhydrides of polycarboxylic acids, like for instance, succinic acid anhydride, maleic acid anhydride or phthalic acid anhydride. Solubilizing sulfonic or carboxylic acid groups may also be introduced by reacting the amines with halogen alkyl- or halogen aralkyl- sulfonic acids or -carboxylic acids or with organic sulfonic acids or carboxylic acids which contain reactive double bonds.

In so far as the resulting products are acids, they are, in the form of their alkali salts, powder or wax-like. In water they dissolve readily to foaming solutions which have a good cleansing, dispersing and wetting capacity. They may be used, for instance as dyeing and textile assistants. In so far as the products contain higher aliphatic radicals, for instance, radicals containing at least 12 carbon atoms, they may also be used as softeners for textiles. Instead of the alkali salts, very often the ammonium salts or the salts with organic amines or ammonium compounds are used with advantage. In so far as the aromatic amines have been made soluble by treatment with alkylene oxides or polyhydroxy compounds they are waxy to oily substances which may also be used as dispersing and cleansing agents and dyeing assistants.

Our invention is furthermore illustrated by the following examples without being restricted thereto, the parts being by weight.

Example 1

26.2 parts of isohexyl-N-hexyl aniline obtainable by reacting isohexylene on N-hexyl aniline in the presence of boron trifluoride or of fuller's earth, are heated with 12 parts chlorosulfonic acid for several hours to 70° C. while stirring. The mixture is neutralized, evaporated and, if desired, the dry residue freed from unsulfonated constituents by extraction with benzine or benzene. A slightly colored powder is obtained which dissolves in water to a foaming solution having a good wetting action.

Example 2

26.2 parts of the secondary aromatic amine mentioned in Example 1 are mixed with 0.3 part caustic soda, and 38 parts ethylene oxide are introduced at 130° C. A brown paste is obtained which dissolves in water to a foaming solution.

Example 3

8.8 parts ethylene oxide are introduced into 26.2 parts isohexyl-N-hexyl aniline. The resulting product is dissolved in ether and sulfonated with 13 parts chloro-sulfonic acid. The aqueous solution of the neutralized sulfonation product displays a good wetting action.

Example 4

29 parts of isooctyl-N-hexyl aniline having been prepared from hexyl aniline and diisobutylene according to Example 1 are warmed for 2 hours with 9.8 parts maleic acid anhydride in dioxane solution at the reflux condenser. After evaporation of the solvent the residue is stirred with diluted caustic soda lye until a clear solution is obtained which foams strongly and has a good wetting action.

Example 5

27.2 parts of hexyl-N-heptyl aniline being obtainable from isohexylene and N-heptyl aniline are refluxed for 2 hours with 10 parts succinic acid anhydride in dioxane solution. After evaporation of the solvent, a brownish mass remains which is soluble in dilute lyes and has good capillary active properties.

Example 6

27.6 parts of N-hexyl-isohexyl-p-toluidine being obtainable from isohexylene and N-hexyl-p-toluidine are mixed with 0.3 part caustic soda, and into the mass 38 parts ethylene oxide are introduced at 130° C. The resulting paste dissolves in water to a foaming solution.

The method of preparing the substituted secondary aromatic amines mentioned in the foregoing examples is more fully illustrated by the following example:

Example 7

90 parts of N-isohexyl aniline which has been prepared in known manner, for instance, from aniline and isohexylene, are heated with 42 parts isohexylene and 20 parts of a German bleaching earth (known under the registered trade-mark "Tonsil AC") to 250° C. while stirring. After some hours the content of the autoclave is subjected to fractional distillation under reduced pressure. At 12 mms. Hg and at 160 to 200° C., about 110 parts of a viscous oil distil, which consists of a mixture of o- and p-isohexyl-N-isohexyl aniline.

Instead of the bleaching earth also boron trifluoride or its compounds with phenol may be used as catalysts.

In the same way other aromatic amines can be alkylated in an aromatic nucleus with unsaturated alkyl or cycloalkyl compounds respectively.

We claim:

1. Secondary aromatic amino compounds which contain a radicle having at least 3 carbon atoms and selected from the class consisting of alkyl radicles and cycloalkyl radicles attached to the amino group and at least 1 radicle having at least 3 carbon atoms and selected from the class consisting of alkyl radicles and cycloalkyl radicles as a substituent of an aromatic nucleus, the total number of carbon atoms of the said substituents of the secondary amino group and of an aromatic nucleus being at least 10, the said secondary aromatic amino compounds having been made water-soluble by introducing a water-solubilizing substituent being selected from the group consisting of the carboxylic acid group, the sulfonic acid group and the hydroxy alkylether radicals.

2. Secondary aromatic amino compounds which contain a radicle having at least 3 carbon atoms and selected from the class consisting of alkyl radicles and cycloalkyl radicles attached to the amino group and at least 1 radicle having at least 3 carbon atoms and selected from the class consisting of alkyl radicles and cycloalkyl radicles as a substituent of an aromatic nucleus, the total number of carbon atoms of the said substituents of the secondary amino group and of an aromatic nucleus being at least 10, the said secondary aromatic amino compounds having been made watersoluble by introducing a sulfonic acid group and a hydroxy alkylether radical.

3. As a new product, a hexyl-N-hexyl aniline having been made watersoluble by introducing a sulfonic acid group.

4. As a new product a hexyl-N-hexyl aniline having been made watersoluble by introducing a sulfonic acid group and a hydroxy alkylether radical.

5. As a new product a hexyl-N-hexyl aniline having been made watersoluble by introducing a sulfonic acid group and a hydroxy ethylether radicle.

ALBERT BALLAUF.
OTTO BAYER.